(12) United States Patent
Popp et al.

(10) Patent No.: US 8,002,954 B2
(45) Date of Patent: Aug. 23, 2011

(54) PROCESS AND APPARATUS FOR PURIFYING SILICON TETRACHLORIDE OR GERMANIUM TETRACHLORIDE CONTAINING HYDROGEN COMPOUNDS

(75) Inventors: Hanns-Peter Popp, Berg (DE); Rainer Nicolai, Basel (CH); Hartwig Rauleder, Rheinfelden (DE); Jürgen Lang, Karlsruhe (DE)

(73) Assignee: Evonik Degussa GmbH, Essen (DE)

( * ) Notice: Subject to any disclaimer, the term of this patent is extended or adjusted under 35 U.S.C. 154(b) by 909 days.

(21) Appl. No.: 11/659,084

(22) PCT Filed: Jun. 10, 2005

(86) PCT No.: PCT/EP2005/052691
§ 371 (c)(1),
(2), (4) Date: Nov. 9, 2007

(87) PCT Pub. No.: WO2006/013129
PCT Pub. Date: Feb. 9, 2006

(65) Prior Publication Data
US 2009/0020413 A1 Jan. 22, 2009

(30) Foreign Application Priority Data
Aug. 4, 2004 (DE) .................. 10 2004 037 675

(51) Int. Cl.
*B01J 19/08* (2006.01)
(52) U.S. Cl. ................................. 204/164
(58) Field of Classification Search .............. 204/164
See application file for complete search history.

(56) References Cited

U.S. PATENT DOCUMENTS

| | | | |
|---|---|---|---|
| 4,923,687 A | 5/1990 | Schork et al. |
| 5,026,533 A | 6/1991 | Matthes et al. |
| 5,616,755 A | 4/1997 | Seiler et al. |
| 5,654,459 A | 8/1997 | Kropfgans et al. |
| 5,698,726 A | 12/1997 | Rauleder et al. |
| 5,852,206 A | 12/1998 | Horn et al. |
| 6,100,418 A | 8/2000 | Standke et al. |
| 6,150,551 A | 11/2000 | Kropfgans et al. |
| 6,177,584 B1 | 1/2001 | Loewenberg et al. |
| 6,222,056 B1 | 4/2001 | Bade et al. |
| 6,291,698 B1 | 9/2001 | Bade et al. |
| 6,372,190 B1 | 4/2002 | Zehe et al. |

(Continued)

OTHER PUBLICATIONS

U.S. Appl. No. 12/999,240, filed Dec. 15, 2010, Seliger, et al.

(Continued)

*Primary Examiner* — Kishor Mayekar
(74) *Attorney, Agent, or Firm* — Oblon, Spivak, McClelland, Maier & Neustadt, L.L.P.

(57) ABSTRACT

The invention relates to a process for the purification's of silicon tetrachloride or germanium tetrachloride contaminated with at least one hydrogen-containing compound, in which the silicon tetrachloride or germanium tetrachloride to be purified is treated in a targeted manner by means of a cold plasma and purified silicon tetrachloride or germanium tetrachloride is isolated from the phase which has been treated in this way. The present invention further relates to an apparatus for carrying out the process of the invention, which comprises a stock and vaporization unit for silicon or germanium tetrachloride (4.1 or 5.1) which is connected via a connecting line with the inlet of the reactor (4.3 or 5.3) with control unit (4.4 or 5.4) for producing the dielectrically hindered discharges whose outlet leads via a pipe either directly or indirectly via at least one further reactor (5.5) to a condensation unit (4.5 or 5.11) with downstream collection vessel (4.6 or 5.12) which is connected via an offtake line (4.6.2 or 5.12.1) to a distillation unit (4.8 or 5.13) and, if appropriate, is equipped with a feed line (4.6.1) to the unit (4.1).

16 Claims, 4 Drawing Sheets

U.S. PATENT DOCUMENTS

| | | |
|---|---|---|
| 6,585,941 B2 | 7/2003 | Zehe et al. |
| 6,680,038 B2 | 1/2004 | Rauleder et al. |
| 6,727,375 B2 | 4/2004 | Steding et al. |
| 7,204,963 B2 | 4/2007 | Rauleder et al. |
| 7,410,914 B2 | 8/2008 | Kuehnle et al. |
| 7,507,850 B2 | 3/2009 | Muh et al. |
| 2008/0283972 A1 | 11/2008 | Muh et al. |
| 2008/0289690 A1 | 11/2008 | Sonnenschein et al. |
| 2009/0259063 A1 | 10/2009 | Lang et al. |
| 2010/0296994 A1 | 11/2010 | Rauleder et al. |

OTHER PUBLICATIONS

U.S. Appl. No. 12/065,126, filed Feb. 28, 2008, Lang, et al.
U.S. Appl. No. 12/738,246, filed Apr. 15, 2010, Rauleder, et al.
U.S. Appl. No. 12/811,925, filed Jul. 7, 2010, Mueh, et al.
U.S. Appl. No. 12/738,799, filed Jul. 13, 2010, Rauleder, et al.
U.S. Appl. No. 12/812,857, filed Jul. 14, 2010, Mueh, et al.
U.S. Appl. No. 12/681,114, filed Apr. 1, 2010, Mueh, et al.
U.S. Appl. No. 12/524,371, filed Jul. 24, 2009, Lang, et al.
U.S. Appl. No. 12/528,087, filed Aug. 21, 2009, Schwarz, et al.

Fig. 1
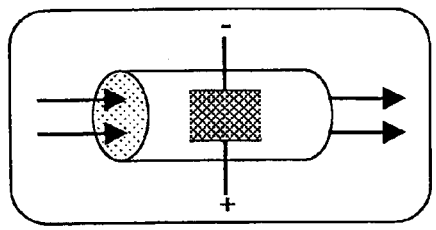
Fig. 1a
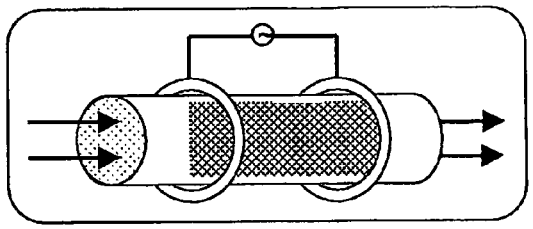
Fig. 1b
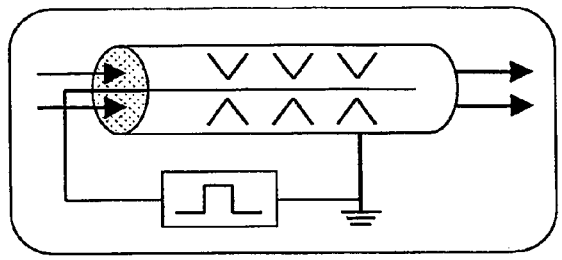
Fig. 1c
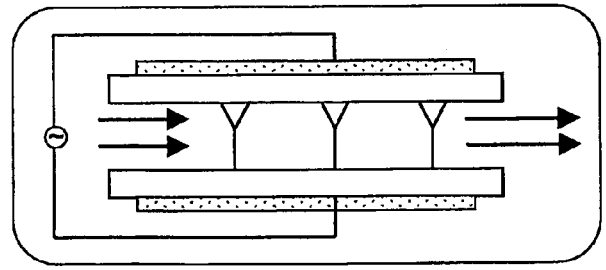
Fig. 1d
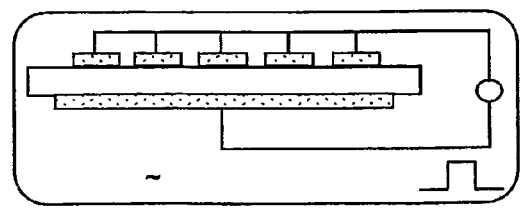
Fig. 1e
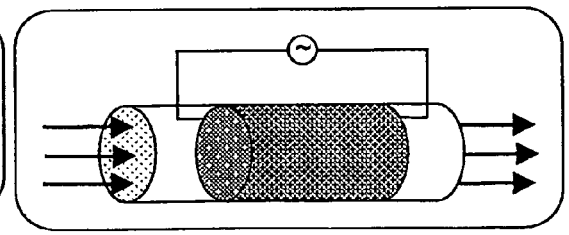
Fig. 1f

PROCESS AND APPARATUS FOR PURIFYING SILICON TETRACHLORIDE OR GERMANIUM TETRACHLORIDE CONTAINING HYDROGEN COMPOUNDS

CROSS REFERENCE TO RELATED APPLICATIONS

This application is the national stage of PCT/EP05/52691, filed Jun. 10, 2005, the disclosure of which is incorporated in its entirety by reference.

BACKGROUND OF THE INVENTION

The present invention relates to a process and an apparatus for the treatment of silicon tetrachloride or germanium tetrachloride contaminated with at least one hydrogen compound which is difficult to separate off by distillation.

Silicon tetrachloride ($SiCl_4$) is used, inter alia, for the production of optical waveguides. $SiCl_4$ of very high purity is required for these applications. In particular, hydrogen-containing impurities are a critical disadvantage, even when they are present in only ppm quantities.

Among hydrogen-containing impurities in silicon tetrachloride, a distinction has to be made between impurities which are difficult and easy to separate off. HCl, for example, can be separated off from the silicon tetrachloride down to a concentration in the range <1 ppm by weight by simple fractional distillation. On the other hand, hydrocarbons in particular, but also chlorinated hydrocarbons and corresponding compounds such as silanes containing alkyl groups, cannot be separated off down to concentrations in the range <1 ppm by weight by simple fractional distillation.

Efforts are likewise made to make germanium tetrachloride available in the purest form possible, in particular in high-purity form.

Possible ways of removing hydrocarbons, chlorinated hydrocarbons and corresponding compounds such as silanes containing alkyl groups from silicon tetrachloride have been known for a long time.

Thus, silicon tetrachloride containing the abovementioned components can be treated as described in U.S. Pat. No. 4,372,834 and EP 0 488 765 A1 with UV radiation in the wavelength range from 200 to 380 nm in the presence of chlorine and the chlorination products obtained can subsequently be separated off from $SiCl_4$ by fine distillation. A significant disadvantage of this process is that the plant components come into contact with chlorine gas which, according to EP 0 488 765 A1, is added in considerable amounts and are thus subjected to particularly severe corrosion, which inevitably leads to frequent downtimes of the plant. Furthermore, the chlorine to be added likewise has to meet very high purity requirements. Both result in high operating costs for the plant. Another particular disadvantage which may be mentioned is the particularly poor energetic efficiency of UV radiation sources proposed, for example, by EP 0 488 765 A1. This results in particularly long treatment times, which likewise leads to high costs.

A general process for purifying halogen and hydrogen compounds of silicon is likewise known (DE-B 10 58 482). In this, chlorosilanes and bromosilanes can be treated by addition of a reducing agent, e.g. hydrogen, silicon, sodium, aluminum or zinc, and action of a gas discharge, in particular a dark gas discharge, resulting in formation of relatively high molecular weight compounds in which the elements carbon, boron or phosphorus can be incorporated in relatively high molecular weight compounds of chlorosilicon by free radical formation and combination of free radicals present, and these relatively high molecular weight compounds are separated off by distillation. A particular disadvantage of this process is the need to add a reducing agent. In particular, DE-B 10 58 482 teaches addition of hydrogen as reducing agent in the purification of an $SiCl_4$ fraction.

SUMMARY OF THE INVENTION

It is an object of the present invention to provide a specific process for purifying silicon tetrachloride or germanium tetrachloride containing hydrogen compounds. A particular objective was to remove hydrogen-containing traces or secondary components, e.g. HCl, —Si—OH-containing species, —C—H-containing species, —Si—C—H-containing species and Si—H-containing species or corresponding Ge species, from silicon tetrachloride or germanium tetrachloride.

In the following, silicon tetrachloride and germanium tetrachloride are also referred to as tetrahalides for short.

BRIEF DESCRIPTION OF THE DRAWINGS

FIG. 1 shows reactors according to several embodiments of the invention.

DETAILED DESCRIPTION OF THE PREFERRED EMBODIMENTS

Figure 2:
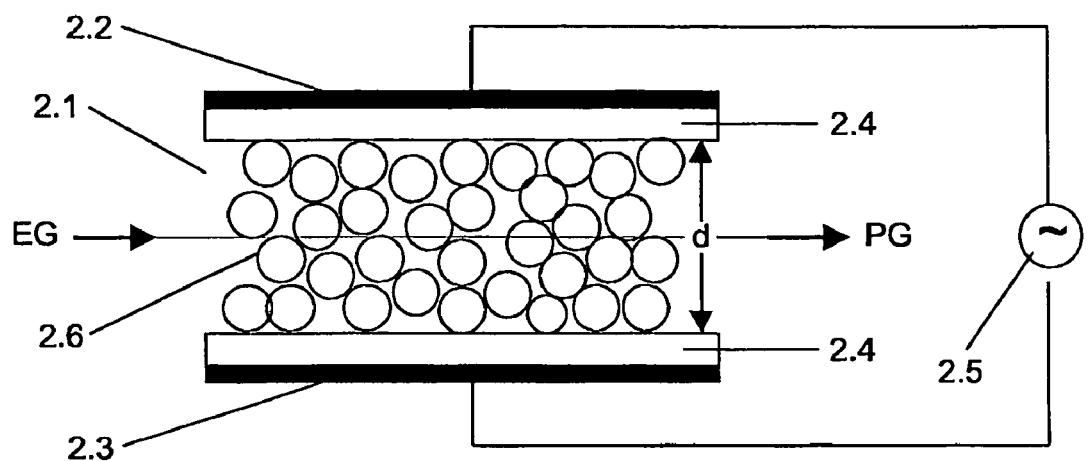
FIG. 2 shows a reactor for carrying out dielectrically hindered discharges according to an embodiment of the invention.

According to the invention, the stated object is achieved as set forth in the claims.

It has surprisingly been found that treatment of silicon tetrachloride by means of a cold plasma, for example, but not exclusively, a plasma based on a dielectrically hindered discharge (DBD=dielectric barrier discharge), is able to react the hydrogen-containing compounds present as impurities in the tetrachloride, advantageously even without addition of a reducing agent, i.e. convert them into species which can be separated from $SiCl_4$, so that they can subsequently be separated off from the tetrachloride phase in a simple and economical way, for example by fractional distillation, advantageously giving a high-purity $SiCl_4$. Thus, the addition of a high-purity, expensive reducing agent as taught by the prior art according to DE-B 10 58 482 can advantageously be dispensed with in the present process. Furthermore, the present process can, in contrast to the prior art according to EP 0 488 765 A1, advantageously be carried out without addition of chlorine ($Cl_2$).

To monitor the effectiveness of the present process, methyltrichlorosilane (MTCS), in particular, can be used as a guide parameter.

Thus, an $SiCl_4$ grade according to the invention advantageously contains less than 1 ppm by weight of MTCS, with the analytical detection limit for MTCS in $SiCl_4$ being 0.2 ppm by weight. The determination of MTCS can be carried out by means of the FTIR or 1H-NMR method.

Furthermore, it has surprisingly been found that the procedure described above for silicon tetrachloride can also be employed for the purification of germanium tetrachloride.

The present invention accordingly provides a process for the treatment of silicon tetrachloride or germanium tetrachloride contaminated with at least one hydrogen-containing compound, in which the silicon tetrachloride or germanium tetrachloride to be purified is treated without the separate addition of a reducing agent, i.e. in a targeted manner by means of a cold plasma, in particular a plasma generated by means of a DBD, and high-purity silicon tetrachloride or germanium tetrachloride is isolated from the phase which has been treated in this way, in particular by means of a subsequent distillation.

The process of the invention is advantageously carried out using a cold plasma.

If a cold plasma or DBD is referred to in the following, this includes all known types and variants of industrial plasmas which are in a nonthermodynamic equilibrium. The definition of a plasma in a nonthermodynamic equilibrium may be found in the relevant specialist literature, e.g. Plasmatechnik: Grundlagen und Anwendungen. Eine Einführung. Authors' Cooperative, Carl Hanser Verlag Munich/Vienna, 1984 (ISBN 3446-136274).

Many technologies for generating a cold plasma are known [Plasmatechnik: Grundlagen und Anwendungen. Eine Einführung. Authors' Cooperative, Carl Hanser Verlag Munich/Vienna, 1984 (ISBN 3446-136274)]. For the process of the invention for the treatment of said tetrahalides, preference is given to AC discharges having frequencies of from 1 to $10^9$ Hz, in particular from 10 to $10^6$ Hz, for example, but not exclusively, also radio frequency (RF) or microwave discharges, corona discharges, capacitively coupled discharges, (high- to low-pressure) glow discharges, high-frequency discharges and dielectrically hindered discharges, also known as barrier discharges, or mixed forms of the abovementioned discharges. Mixed forms of these electric gas discharges (glow discharges) which may be operated capacitively or inductively coupled or else in a pulsed fashion are likewise suitable. Preference is given to using barrier discharges operated using an AC potential or operated in a pulsed fashion.

A barrier discharge can be generated between two metallic electrodes of which at least one is coated with a dielectric which prevents spark or arc formation between the two metallic electrodes. Instead, many brief and highly localized microdischarges whose discharge time and energy content is restricted by the dielectric are formed. Suitable dielectrics are ceramics, glass, porcelain or insulating plastics, for example Teflon. Further suitable materials are described, for example, in VDE 0303 and DIN 40685.

Barrier discharges can appropriately be operated at pressures of from 0.1 mbar to 10 bar. The discharge is electrically induced by applying a changing voltage to the electrodes. Depending on the pressure in the discharge zone, spacing of the electrodes, frequency and amplitude of the AC voltage, discharges which have a duration of only a few nanoseconds and are randomly distributed both in space and time are formed when an ignition voltage is exceeded.

Figure 3:
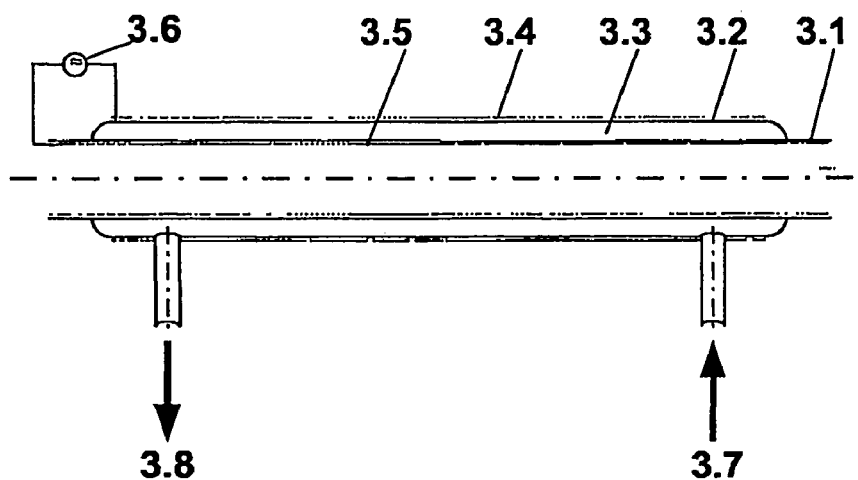
FIG. 3 shows a reactor according to a preferred embodiment of the invention.

Reactors which can be used for the purposes of the invention are illustrated by way of example with the aid of FIGS. 1, 2 and 3.

FIG. 1 shows the in-principle structure of various, but not exclusively usable, variants of plasma reactors, for example for the treatment of said tetrahalides.

FIG. 2 shows a preferred embodiment based on an "electrified packed-bed reactor" or "surface discharge reactor", cf. FIGS. 1*f* and 1*e*. Thus, a "silent discharge reactor" can be filled with dielectric packing elements. As shown in the illustration in FIG. 2, dielectric balls or pellets (2.6) can be packed between two dielectric barriers (2.4) to form a (ball) bed or reaction space (2.1). In this type of reactor, the discharge particularly advantageously ignites on the surface of the dielectric packing elements (2.6). In FIG. 2, (2.2) and (2.3) denote, for example, two metallic electrodes which are located opposite one another and are connected to an AC voltage source (2.5). To suppress the formation of a discharge arc between the two electrodes, both electrodes can be coated with a dielectric (2.4). Such a discharge is referred to as dielectrically hindered on both sides. However, it is also possible to coat only one of the electrodes with a dielectric. In this case, a gas discharge which is dielectrically hindered on one side and is operated by the appropriate electrical excitation is formed. In a particularly preferred variant, the dielectric (2.4) is positioned in the middle. A discharge hindered on one side can then be formed both to the upper metal electrode and to the lower metal electrode.

The electric excitation can be characterized as follows:

On application of an AC voltage to the two electrodes, ignition of the desired discharge occurs when the field strength in the discharge volume is sufficiently high. The voltage required depends on the free distance (d) between dielectric and counterelectrode, on the dielectric used and on the pressure in the discharge section, on the gas composition and on any internals present between the dielectrics in the discharge space. The distance (d) is appropriately set to a value in the range from 0.01 to 100 mm, preferably from 0.1 to 10 mm. The voltages required can be from 10 Vp to 100 kVp; preferably from 100 Vp to 15 kVp, particularly preferably from 500 Vp to 5 kVp, in a microsystem. The frequency of the AC voltage is advantageously in the range from 1 Hz to 30 GHz, preferably from 50 Hz to 250 MHz, and in the range of industrially available microwave generators, for example at 2.45 GHz. Further transmission frequencies are explicitly not ruled out.

The plasma reactor shown in FIG. 2 is advantageously filled with pellets (2.6) for carrying out the process. The electric discharge takes place first and foremost in the form of sliding discharges on the surface of the pellets. This increases the concentration of ions and free radicals in the immediate spatial vicinity of the surface of the pellet, which leads to improved reaction of the hydrogen-containing compounds present in the gas stream.

Pellets used can advantageously comprise a support material selected from the group consisting of aluminum oxide, titanium oxide, zirconium oxide, cerium oxide, silicon dioxide, magnesium oxide or mixed oxides thereof. Preference is given to silicon oxide pellets (glass pellets).

If pellets are referred to in the following, this also includes particles, powder or dust or other particle size states. The diameters can vary within the range from 100 nm to 10 mm, preferably from 10 µm to 1 mm.

The electrodes of the plasma reactor can be configured as sheet-like structures aligned parallel to one another or can form a coaxial arrangement with a central electrode which is surrounded by a tubular electrode. To aid the formation of discharges, spatial inhomogeneities can be provided, for example by means of helical electrodes which lead to local increases in the field and thus to improved formation of the discharge (ignition). The dielectric plates (2.4) on the electrodes (2.2) and (2.3) can, for example, be provided with corrugated surfaces in the form of a comb (cf. J. Lang et al., WO 98/49368, and the secondary literature cited therein).

FIG. 3 shows a preferred embodiment of a reactor for generating a DBD.

The reaction space (3.3) of the reactor in FIG. 3 is appropriately bounded by two walls (3.1 and 3.2) which have a spacing of a few millimeters, preferably from 0.1 to 3 mm, for use in the process of the invention. In the case of the "discharge hindered on one side", it is possible, as indicated above, for one wall to consist of an electrically insulating material, e.g. fused silica or oxide ceramic, and one reactor wall to consist of an electrically conductive material, e.g. stainless steel. In the case of the "discharge hindered on both sides", both walls generally consist of electrically insulating material (dielectric having a high dielectric strength). Here, the electrodes (3.4 and 3.5) should then be provided for the injection of, for example, the electric energy provided by means of a pulsed DC source (3.6). The tetrahalide-containing phase to be purified is appropriately introduced via the inlet (3.7). The treated phase can then be passed via (3.8) to, for example, a further reactor, a collection vessel or a distillation unit.

In the present process, suitable reactors can also be configured as microreactors.

Furthermore, it is also possible to use, for example, ozonizers as reactors for carrying out the process of the invention.

It is also possible to use one or more reactors for generating the gas discharge for the treatment of the tetrahalide to be purified in the process of the invention. If more than one reactor is used, these can be connected in series or in parallel.

As is known per se, the injected electric energy in the case of a plasma discharge is dependent on the product of pressure p and electrode spacing d (p·d), so that, at a constant gas pressure, particular free-radical reactions can be promoted or suppressed in the plasma solely via a change in the geometry of the reactor. In the process of the invention, the product of electrode spacing and pressure should be in the range from 0.01 to 300 mm·bar, preferably from 0.05 to 100 mm·bar, particularly preferably from 0.08 to 0.3 mm·bar, in particular from 0.1 to 0.2 mm·bar.

The discharge can be induced by means of various AC voltages or pulsed voltages of from 1 to $10^6$ V. Furthermore, the shape of the curve of the voltage applied for generating the discharge can, for example, but not exclusively, be rectangular, trapezoidal, sinusoidal, triangular, pulsed or made up of blocks of individual wave shapes. Suitable voltage-time curves can also be generated by Fourier synthesis.

Pulsed excitation voltages are particularly suitable for achieving a high electron density and essentially simultaneous formation of the discharge in the entire discharge space of the reactor. The pulse time in pulse operation depends on the gas system and is preferably in the range from 10 ns to 1 ms. The voltage amplitudes can be from 10 Vp to 100 kVp, preferably from 100 Vp to 10 kVp, particularly preferably from 500 Vp to 5 kVp, in a microsystem. These pulsed DC voltages can also be operated and modulated from high repetition rates, for example 10 MHz in the case of a 10 ns pulse (modulation ratio=10:1) through to low frequencies (from 10 to 0.01 Hz), for example as "burst functions", in order to make the reaction of adsorbed species possible.

The plasma reactor used in the process of the invention can be made of any electrically and thermally suitable material. Stainless steel in combination with plastics, ceramics and glasses is particularly preferred. Hybrid constructions made of various materials are likewise advantageous.

It is known that the dielectrically hindered discharge is a transient gas discharge consisting of filament-like discharges of short duration. The distance between the electrodes is generally about one millimeter. Both electrodes are appropriately made of metal. A dielectric, e.g. glass or ceramic, is appropriately applied/inserted on or between these. If the reactor wall itself forms one of the two electrodes, i.e. is made of a metallic material, the discharge is said to be a "discharge hindered on one side".

In this case, preference is given to a dielectrically hindered discharge having a frequency of from 50 Hz to 100 MHz, particularly preferably from 100 Hz to 1 MHz, very particularly preferably from 400 to 4000 Hz; in particular, all values in the range from 10 to 100 kHz are also advantageous.

Furthermore, when a reactor which is operated at a power of more than about one watt is used, it can be advantageous to use, for example, electrodes cooled by means of water.

Figure 4:
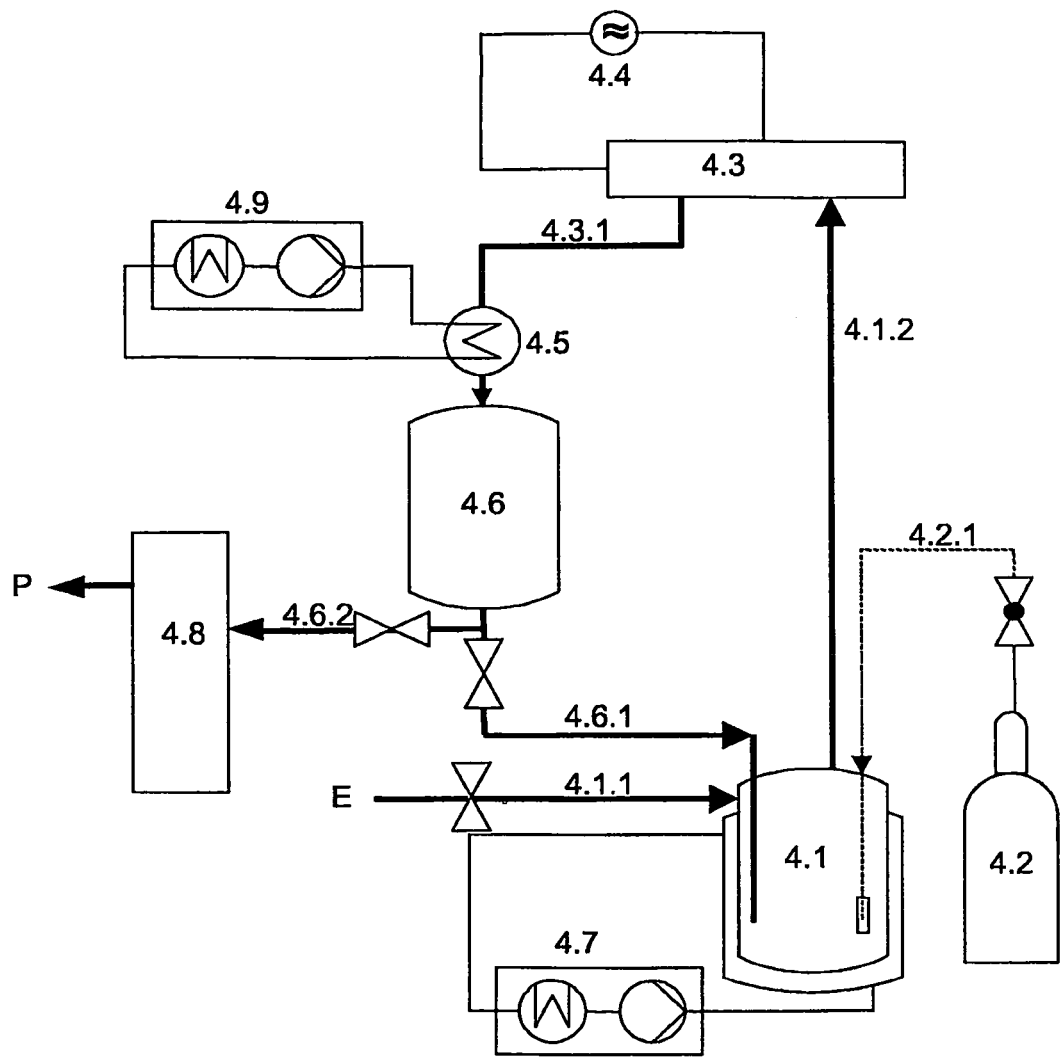
FIG. 4 shows a process flow diagram for an embodiment of the invention.
Figure 5:
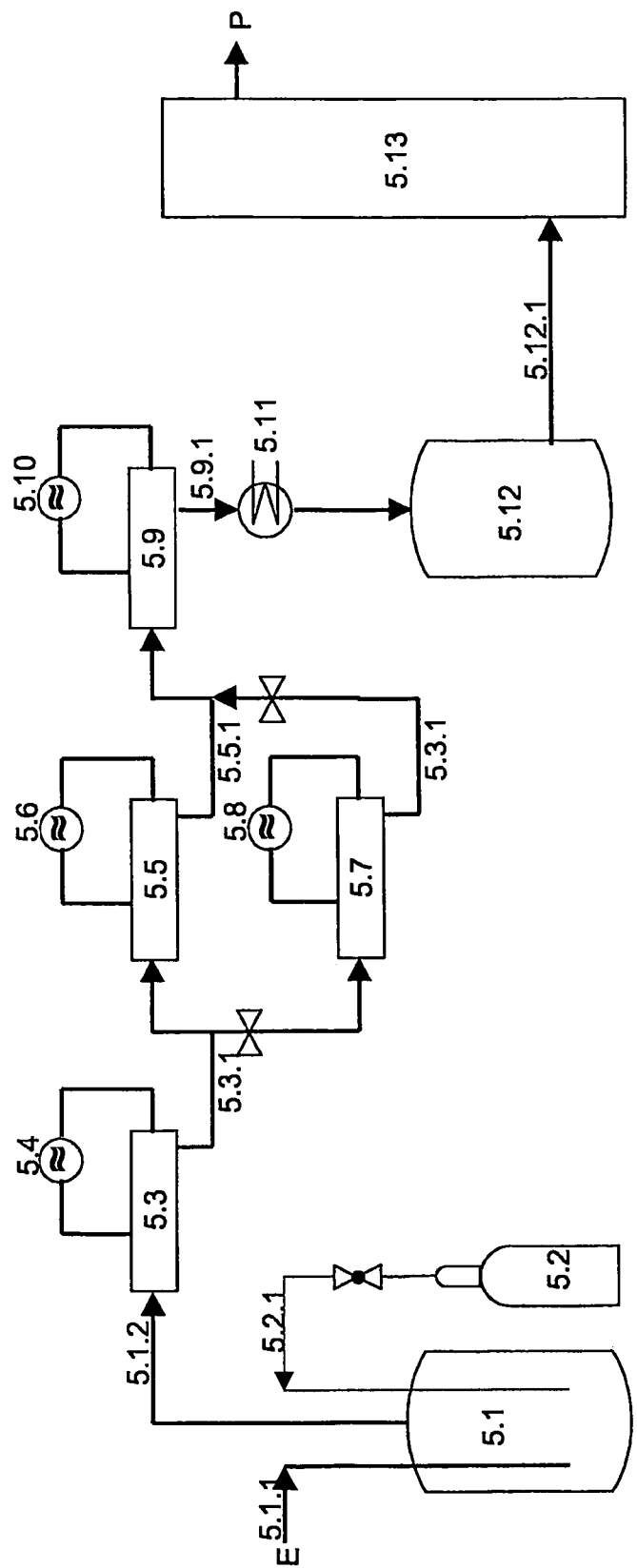
FIG. 5 shows a process flow diagram for an embodiment of the invention wherein reactors are arranged both in series and in parallel.

In addition, FIGS. 4 and 5 show flow diagrams of preferred embodiments of plants for carrying out the process of the invention.

The present invention thus also provides an apparatus for the treatment of silicon or germanium tetrachloride by the process of the invention, which comprises a stock and vaporization unit for silicon or germanium tetrachloride (4.1 or 5.1) which is connected via a connecting line with the inlet of the reactor (4.3 or 5.3) with control unit (4.4 or 5.4) for producing the dielectrically hindered discharges whose outlet leads via a pipe either directly or indirectly via at least one further reactor unit (5.5) to a condensation unit (4.5 or 5.11) with downstream collection vessel (4.6 or 5.12) which is connected via an offtake line (4.6.2 or 5.12.1) to a distillation unit (4.8 or 5.13) and, if appropriate, is equipped with a feed line (4.6.1) to the unit (4.1).

To carry out the process of the invention, the silicon tetrachloride or germanium tetrachloride phase to be treated (hereinafter also referred to as phase for short) is preferably converted into the gas phase. For this purpose, an entrainer gas, preferably an inert gas under superatmospheric pressure, can advantageously be preheated if appropriate and passed through the tetrahalide-containing phase to be purified, which is generally liquid at room temperature, and the gas phase which has in this way been enriched with the product to be purified can be fed to the reactor. However, it is also possible to preheat the stock unit (4.1) and convert the tetrahlide into the gas phase. The treatment according to the invention can, however, also be carried out in a mixed phase as is formed, for example, in the case of a falling film (liquid phase and gas phase present at the same time).

The phase to be treated is preferably passed through the discharge zone of the reactor at a flow velocity of from 0.01 to 100 m/s, in particular from about 0.1 to 10 m/s. The exposure time per discharge is then preferably from 10 ns to 1 s, i.e. the phase to be treated preferably spends a total of from 1 ms to 10 minutes in the discharge zone.

The treatment of the phase is, according to the invention, appropriately carried out at a pressure of from 0.1 mbar to 10 bar abs., preferably from 1 mbar to 2 bar abs., particularly preferably from 100 mbar to 1.5 bar abs., very particularly preferably from 200 mbar to 1 bar abs., in particular from 250 to 500 mbar abs., with the phase to be treated preferably being at a temperature of from −40 to 200° C., particularly preferably from 20 to 80° C., very particularly preferably from 40 to 60° C., in the case of silicon tetrachloride. In the case of germanium tetrachloride, the corresponding temperature can advantageously also be higher.

When carrying out the process of the invention, nitrogen or another buffer gas which is inert in terms of the purification task, preferably argon, or else helium, xenon or another noble gas or a mixture thereof, can also be added to the phase to be treated at one or more points in the process.

Furthermore, a selected halogen donor, for example chlorine, can also be added in the process of the invention.

The present invention can be carried out either continuously or batchwise.

Depending on the degree of contamination, the phase to be treated can be circulated in the process of the invention and appropriately be treated at least once by means of the dielectrically hindered discharge. The residence time of the gaseous silicon or germanium tetrachloride in the reactor can in this case be set so as to enable the treatment according to the invention to be carried out particularly advantageously in one cycle or over a plurality of cycles (circulation mode), i.e., for example, two, three or more circulations. The continuous process is generally carried out in one cycle. It can in this case be advantageous to use apparatuses which allow a sufficient residence time, for example plants in which a plurality of reactors are connected in series and/or in parallel.

Furthermore, the process of the invention, in particular when carried out continuously, can advantageously be accompanied by analytical measurements on the liquid silicon or germanium tetrachloride fraction, using, for example, the methyltrichlorosilane content as guide parameter.

In the process of the invention, the phase which has been treated in this way is generally cooled in steps and the purified $SiCl_4$ or $GeCl_4$ fraction is discharged, i.e. the pure product is preferably separated off from the treated phase by fractional distillation.

The process of the invention is generally carried out by vaporizing the silicon or germanium tetrachloride which contains hydrogen compounds and is to be purified, treating the gas phase by means of a DBD, condensing the phase which has been treated in a targeted manner in this way and carrying out this cycle once or, if appropriate, a plurality of times. It can be advantageous here to preheat an inert gas, e.g. a noble gas, and utilize it as carrier gas for vaporizing the silicon or germanium tetrachloride to be purified. Furthermore, a chlorine donor can be fed into the system at one or more points, for example before the gas phase enters the reactor.

The treatment according to the invention of $SiCl_4$ or $GeCl_4$ contaminated with hydrogen compounds can therefore be carried out in different ways:
  DBD treatment of the phase to be purified, i.e. without a further additive.
  DBD treatment in the presence of one or more additives such as hydrogen halide (HX) and/or halogen ($x_2$) (preferably with X=Cl) and/or noble gases (He, Ar, Xe) or nitrogen.
  DBD treatment initially without additives and then continuation of the treatment in the presence of at least one of the abovementioned additives.

The process of the invention can particularly advantageously be carried out without addition of a reducing agent.

As parameter for determining the effectiveness of the process of the invention, preference is given to using the decrease in the content of methyltrichlorosilane (MTCS) or methyltrichlorogermane (MTCGe) which can be present in a silicon or germanium tetrachloride to be purified, generally in an amount of from 1 to 500 ppm by weight. Thus, for example, starting from 133 ppm by weight of MTCS, the methyltrichlorosilane is generally no longer detectable after the DBD treatment according to the invention is complete, even without addition of one of the additional substances mentioned, i.e. its values can be reduced to <1 ppm by weight (detection limit by the FTIR method) or <0.2 ppm by weight (detection limit by 1H-NMR method).

An $SiCl_4$ phase which has been treated in this way and preferably has, as guide parameter, an MTCS content of about <1 ppm by weight can then be passed to a separation. The separation can advantageously be carried out by fractional distillation, with high-purity silicon tetrachloride preferably being obtained as purified product.

The process of the invention and the apparatus of the invention also display an extremely high effectiveness. Thus, silicon or germanium tetrachloride containing methyltrichlorosilane (MTCS) or methyltrichlorogermane (MTCGe) in amounts up into the percentage range can be completely free of this by means of the DBD treatment process of the invention. If trichlorosilane (TCS) or trichlorogermane (TCGe) is additionally present in the $SiCl_4$ or $GeCl_4$ phase to be purified, this can be removed at the same time in an advantageous way.

The present invention is illustrated by the following example without the claimed subject matter being restricted thereby.

EXAMPLE

In an example, the reaction space is formed by two coaxial fused silica tubes and the mean diameter of the annular gap formed in this way is preferably from 25 to 30 mm at a length of 250 to 300 mm. A scale-up can be achieved by increasing the diameter and/or by connecting tube reactors in parallel (tube bundle). However, a planar arrangement is likewise possible. It may be mentioned at this point that the process can be scaled up/down as desired via the reactor area.

The above-described plasma reactor shown in FIG. 3 is integrated into a process apparatus (cf. FIG. 4). This is evacuated beforehand. About 500 ml of silicon tetrachloride (E) are introduced via (4.1.1) into a stock vessel/vaporizer (4.1) comprising a glass vessel which can be heated by means of the thermostat (4.7). The silicon tetrachloride used here contains 133 g/kg of methyltrichlorosilane (MTCS) and 6 g/kg of trichlorosilane (TCS) as impurities. Silicon tetrachloride is vaporized by heating the stock vessel/vaporizer and flows through the above-described reactor (4.3) (cf. FIG. 3; fused silica, diameter about 30 mm, length about 250 mm), is then condensed in a condenser (4.5) cooled by means of the cryostat (4.9) and thus goes into the collection vessel (4.6). While silicon tetrachloride flows through the reactor, an AC voltage having a frequency of 1.9 kHz and an amplitude of 35 kV "peak to peak" (4.4) is applied to the reactor. The power input into the reactor is about 40 W (primary side power measurement in accordance with European standard). The operating pressure in the apparatus can be set to about 300 mbar via a pressure regulator. The amount of silicon tetrachloride flowing through the reactor can be set (about 250 ml/h) via the vaporizer line of the thermostat (4.7). After all the silicon tetrachloride has been transferred from the stock vessel via the reactor to the collection vessel, the silicon tetrachloride is drained from the collection vessel (4.6) back into the stock vessel (4.1). After 4 cycles, the silicon tetrachloride which has been treated in this way has an MTCS content of <1 ppm by weight (FTIR) or <0.2 ppm by weight (1H-NMR). The silicon tetrachloride fraction which has been treated in this way is subsequently transferred from the collection vessel (4.6) to the distillation unit (4.8) where a fraction of high-purity silicon tetrachloride (P) is separated off. The content of impurities in this corresponds to the achievable detection limit. Thus, not only the MTCS content but also the TCS content is reduced to <1 ppm. Complete removal of MTCS and TCS from tetrachlorides is therefore also possible without addition of a reducing agent.

In a further preferred embodiment of the process according to FIG. 4, a fraction of the condensed treated silicon tetrachloride or germanium tetrachloride in Collection vessel 4.6 may be removed from the process flow in a substream 4.6.2 and transferred to distillation unit 4.8.

The quantity of condensed silicon tetrachloride or germanium tetrachloride removed in substream 4.6.2 is replaced with more starting material to be treated (E) through 4.1.1 added to stock vessel 4.1.

Legends:

FIG. 1 shows examples of reactors for preferred embodiments of gas discharges according to the invention:

FIG. 1a—Plasma reactor based on a glow discharge (glow discharge)

FIG. 1b—Radiofrequency plasma reactor (RF discharge)

FIG. 1c—Pulsed corona plasma reactor (pulsed corona)

FIG. 1d—Plasma reactor based on a barrier discharge hindered on both sides (silent discharge—dielectric barrier discharge)

FIG. 1e—Plasma reactor based on surface discharge (surface discharge)

FIG. 1f—Triple-bed plasma reactor (packed bed)

FIG. 2 shows the in-principle structure of a preferred embodiment of a reactor for carrying out dielectrically hindered discharges:

EG Feed gas
d Diameter
2.1 Reaction bed or reaction space
2.2 Electrode
2.3 Electrode
2.4 Dielectric
2.5 AC voltage source
2.6 Dielectric balls or pellets
PG Product gas FIG. 3 schematically shows a preferred embodiment of a reactor for carrying out the process of the invention:

3.1 Wall of the reaction space
3.2 Wall of the reaction space
3.3 Reaction space
3.4 Electrode
3.5 Electrode
3.6 AC source
3.7 Inlet for the starting material phase
3.8 Outlet for the treated phase FIG. 4 shows the flow diagram of a preferred embodiment of an apparatus for carrying out the process of the invention with circulation:

E Starting material phase to be treated
4.1 Stock vessel (heatable, coolable)
4.2 Inert gas in pressure container
4.3 Reactor for gas discharges
4.4 AC source
4.5 Condensation and monitoring unit
4.6 Collection vessel
4.7 Heating/cooling unit
4.8 Distillation unit
4.9 Cooling unit
P Product fraction FIG. 5 shows the flow diagram of a preferred embodiment of an apparatus for carrying out the process of the invention, with the reactors being arranged both in series and in parallel:

E Starting material phase to be treated
5.1 Stock vessel (heatable, coolable)
5.2 Inert gas in pressure container
5.3 Reactor for gas discharges
5.4 AC source
5.5 Reactor for gas discharges
5.6 AC source
5.7 Reactor for gas discharges
5.8 AC source
5.9 Reactor for gas discharges
5.10 AC source
5.11 Condensation and monitoring unit
5.12 Collection vessel
5.13 Distillation unit
P Product fraction

The invention claimed is:

1. A process for the treatment of silicon tetrachloride or germanium tetrachloride contaminated with at least one hydrogen-containing compound, in which the contaminated silicon tetrachloride or germanium tetrachloride to be purified is treated with a cold plasma in a discharge zone of a reactor and a purified silicon tetrachloride or germanium tetrachloride is isolated from the treated silicon tetrachloride or germanium tetrachloride.

2. The process as claimed in claim 1, wherein the cold plasma is generated by a dielectrically hindered discharge, a capacitively coupled discharge, a radiofrequency discharge, a microwave discharge, a corona discharge, a (high- to low-pressure) glow discharge or a mixed form thereof.

3. The process as claimed in claim 2, wherein the cold plasma is generated by a dielectrically hindered discharge produced using an AC voltage or a DC pulse voltage from 1 V to $1 \times 10^6$ V.

4. The process as claimed in claim 2, wherein the cold plasma is generated by a dielectrically hindered discharge produced at a frequency of from 50 Hz to 100 MHz.

5. The process as claimed in claim 2, wherein the cold plasma is generated by the dielectrically hindered discharge produced at a temperature in a gas phase of from −40 to 200° C.

6. The process as claimed in claim 1, wherein the contaminated silicon tetrachloride or germanium tetrachloride to be treated passes through the discharge zone at a flow velocity of from 0.01 to 100 m/s.

7. The process as claimed in claim 1, wherein an exposure time of the contaminated silicon tetrachloride or germanium tetrachloride to the cold plasma per discharge of AC voltage or pulsed voltage in the discharge zone is from 10 ns to 1 s.

8. The process as claimed in claim 1, wherein the contaminated silicon tetrachloride or germanium tetrachloride is treated for 1 ms to 10 min in the discharge zone.

9. The process as claimed in claim 1, wherein at least one inert buffer gas selected from the group consisting of at least one noble gas and nitrogen is added to the contaminated silicon tetrachloride or germanium tetrachloride to be treated at one or more points in the process.

10. The process as claimed in claim 1, wherein chlorine and/or hydrogen chloride are/is added to the contaminated silicon tetrachloride or germanium tetrachloride to be treated.

11. The process as claimed in claim 1, wherein the treatment is carried out at a pressure of from 0.1 mbar to 10 bar abs., and a temperature of from −40 to 200° C.

12. The process as claimed in claim 1, wherein the process is operated continuously or batchwise.

13. The process as claimed in claim 1, wherein the process is accompanied continuously by analytical measurements on a treated liquid silicon tetrachloride fraction or germanium tetrachloride fraction.

14. The process as claimed in claim 1, wherein the treated phase is cooled and the purified silicon tetrachloride fraction or germanium tetrachloride fraction is discharged.

15. The process as claimed in claim 1, wherein
the contaminated silicon tetrachloride or germanium tetrachloride is circulated through a cycle, comprising: vaporization, cold plasma treatment and condensation, wherein
an analytical guide parameter is monitored in the treated silicon tetrachloride or germanium tetrachloride, a substream is optionally taken off from the condensed treated silicon tetrachloride or germanium tetrachloride, and fed to a distillation unit, and an amount of the condensed treated silicon tetrachloride or germanium tetrachloride taken from the cycle in the substream is replaced by a corresponding quantity of contaminated silicon tetrachloride or germanium tetrachloride to be purified, which is fed to the cycle for vaporization.

16. The process as claimed in claim 15, wherein the contaminated silicon tetrachloride or germanium tetrachloride to be treated is converted into a gas phase, an inert gas and/or chlorine is optionally added, the gas phase is exposed at least once to the cold plasma treatment, the treated silicon tetrachloride or germanium tetrachloride is monitored using the analytical guide parameter, and a fraction consisting of high-purity silicon tetrachloride or germanium tetrachloride is obtained from the condensed treated substream by distillation.

* * * * *